United States Patent Office 2,779,722
Patented Jan. 29, 1957

2,779,722
PROCESS FOR RECOVERY OF NAPHTHALENE FROM CRUDE NAPHTHALENE

James V. Murray, Jr., South Charleston, and John R. Anderson, St. Albans, W. Va., assignors to Union Carbide and Carbon Corporation, a corporation of New York No Drawing. Application July 26, 1954,
Serial No. 445,924

22 Claims. (Cl. 202—59)

This invention relates to the purification of naphthalene and is a continuation-in-part of our copending U. S. application Serial No. 377,694, now abandoned. More particularly, this invention relates to an oxidation method for converting sulphur containing impurities having boiling points near that of naphthalene into compounds having higher boiling points, so that relatively pure naphthalene may then be separated by conventional means.

It is well known in the art that naphthalene may readily and economically be separated from all normal impurities except thianaphthene by a combination of procedures including fractional distillation, crystallization, and sulphuric acid-washing. Such normal refinement procedures, however, leave the naphthalene product still contaminated with thianaphthene. The difficulty in removing the thianaphthene stems from the fact that thianaphthene has a boiling point close to the boiling point of naphthalene, and apparently forms solid solutions with naphthalene. Furthermore, thianaphthene is not sufficiently preferentially attacked by sulphuric acid.

It is an object of this invention to provide a method whereby impurities, particularly thianaphthene, may be readily removed from naphthalene. It is a further object of this invention to provide a method for the removal of thianaphthene wherein there are formed no insoluble products upon removal. Yet another object is to provide a method for purging crude naphthalene of all the usual impurities including thianaphthene without an additional operational step.

The present commonly employed method for removing thianaphthene from naphthalene involves treating the mixture with sodium. Naphthalene is then removed from the reaction product by fractional distillation. There are, however, several disadvantages to this method. The sodium reagent which is used is expensive, and the waste products evolved in the process create an expensive and involved disposal problem. The fractional distillation employed is not wholly satisfactory without additional procedures because insoluble products are formed on the still heaters. This, of course, cuts down efficiency and necessitates frequent scraping and cleaning of the heaters.

We have discovered a method whereby naphthalene containing thianaphthene may be readily and economically purged of the thianaphthene, as well as other impurities. Our invention comprises treating naphthalene-thianaphthene mixtures with an aliphatic peracid. By this treatment practically all of the thianaphthene is converted to a high boiling oxidized product, from which relatively pure naphthalene may be separated economically by fractional distillation. Also, by the practice of our invention crude naphthalene may be purged of all the usual impurities, including thianaphthene. Thus, the invention has the advantage of purging crude naphthalene of all impurities in one operation.

We have found that the lower aliphatic peracids are highly effective in this treatment. Such lower aliphatic acids include performic acid, peracetic acid, perpropionic acid and perbutyric acid. Peracetic acid is slightly more effective than the others but the choice of the particular acid to be employed will depend mainly on such factors as price and availability. We have also attempted to use aromatic peracids, such as perbenzoic and perphthalic acid, in the invention, but they are less effective and remove only a small proportion of the thianaphthene present.

The treatment with the aliphatic peracid may be accomplished in several ways. The mixture of naphthalene and thianaphthene may be treated directly, or when dissolved in a solvent, or when suspended in water, or when dissolved in a solvent and suspended in water. A solution of a peracid in a solvent such as acetone may be used. Alternately the peracid may be formed in situ by using the acid and a solution of hydrogen peroxide in water, preferably in the presence of a catalyst, such as sulfuric acid. The reaction is a rapid one and goes well at room temperature with the short carbon chain peracids, time and temperature not being critical. With all the peracids the reaction time can be accelerated, if desired, by raising the temperature, and with the longer carbon chain acids an elevated temperature should be used.

When the reaction is complete, the excess peracid, any acid formed during the reaction, and any other water soluble components may be removed by extraction with water or with aqueous sodium hydroxide solution or both, and the raffinate remaining is then distilled. Alternatively, the reaction mixture may be distilled directly, without the extraction step. In any event, sulphur-free naphthalene is removed as a distillate and the high-boiling point oxidized sulphur product of the reaction of the thianaphthene and the peracid is left as a bottom fraction.

The following examples serve to illustrate the invention, but do not limit it to less than what is claimed. In all the examples, the percentage by weight of thianaphthene present in the various mixtures was determined spectrometrically, by which method as little as 0.01 percent of thianaphthene in naphthalene may be detected.

Example I

Five hundred grams of commercial moth crystal naphthalene, having a freezing point of 79.90° C. and containing 0.95 percent by weight of thianaphthene, were dissolved in 1100 grams of benzene. The solution was treated with 100 milliliters of 25 percent peracetic acid in acetone at a temperature of between 50° and 70° C. for a period of two hours. The mixture was then extracted with three 100-milliliter portions of water and the extract phase was discarded. The raffinate remaining was distilled at atmospheric pressure using a packed column. After the benzene present was distilled off, a distillate of naphthalene having a freezing temperature of 80.25° C. was recovered. No thianaphthene could be detected spectrometrically in the naphthalene and the recovery of desulphurized naphthalene was in excess of 90 percent by weight.

Example II

Five hundred fifty grams of commercial moth crystal naphthalene, having a freezing point of 79.90° C. and containing 0.95 percent by weight of thianaphthene were suspended in 1500 milliliters of water at a temperature of 75° C., 100 milliliters of benzene was added, and the resulting suspension of the two immiscible liquid phases was treated with 100 milliliters of a 25 percent solution of peracetic acid in acetone. The temperature was gradually raised to 85° C., with continuous stirring. The mixture was cooled, the water layer was removed, and the remaining mixture was once extracted with water, once with aqueous 10 percent sodium hydroxide, and again with water. The raffinate remaining was distilled at atmospheric pressure, using a packed column. After the benzene present was distilled off, a purified naphthalene fraction in excess of 90 percent by weight of the naphthalene feed was recovered having a freezing point of 80.25° C. and containing less than 0.01 percent by weight of thianaphthene.

*Example III*

Five hundred fifty grams of commercial moth crystal naphthalene, having a freezing point of 79.90° C. and containing 0.95 percent by weight of thianaphthene, were dissolved in 1200 grams of benzene containing one gram of sulphuric acid (specific gravity 1.86). A solution of 50 milliliters of 30 percent hydrogen peroxide in water and 50 milliliters of glacial acetic acid was added. The temperature was raised gradually from 25° to 60° C. over a four-hour period, with continuous stirring. The mixture was cooled and extracted with water and the extract was discarded. The raffinate remaining was distilled at atmospheric pressure, using a packed column. After the benzene present was distilled off, a purified naphthalene fraction was recovered in excess of 90 percent by weight of the naphthalene feed having a freezing point of 80.25° C. and containing 0.05 percent by weight of thianaphthene.

*Example IV*

Six hundred and one grams of crude naphthalene, containing other naturally occurring impurities in addition to thianaphthene were dissolved in 350 grams of benzene in the presence of 550 grams of water at 78° C. The solution was treated with 100 milliliters of a 25 percent solution of peracetic acid in acetone and a temperature of approximately 78° C. was maintained for a period of two hours. The reaction mixture was cooled and extracted twice with water, and twice with aqueous 10 percent sodium hydroxide. The extracts were discarded. The raffinate remaining was distilled at atmospheric pressure, using a packed column. After the benzene present was distilled off, a purified naphthalene fraction was obtained in excess of 90 percent by weight of the naphthalene feed, having a freezing point of 80.0+° C. and containing substantially no thianaphthene.

*Example V*

One pound of commercial moth crystal naphthalene was dissolved in 1800 grams of benzene. The solution was treated with 125 milliliters of twenty-five percent peracetic acid in acetone at a temperature of between 25° and 30° C. for a period of approximately 60 hours. The mixture was then distilled at subatmospheric pressure using a packed column. After the benzene present was distilled off, a purified fraction was recovered in excess of 90 percent by weight of the naphthalene feed having a freezing point of 80.0+° C. and containing substantially no thianaphthene.

*Example VI*

One pound of commercial moth crystal naphthalene containing 1.0 percent thianaphthene was dissolved in 1400 grams of benzene. Fifty milliliters of anhydrous formic acid and 25 milliliters of 30 percent hydrogen peroxide were added at once, and an additional 25 milliliters of 30 percent hydrogen peroxide was added over the next half hour while the mixture was stirred. Stirring was continued for about 15 hours at a temperature of 30° to 35° C. The benzene phase was separated and then washed three times with 500 milliliter portions of water, after which it was distilled. After the benzene had been distilled off, a purified naphthalene distillate was obtained in excess of 90 percent by weight of the naphthalene feed which contained less than 0.01 percent thianaphthene, as determined spectrometrically.

*Example VII*

Four hundred grams of commercial moth crystal naphthalene containing 0.92 percent by weight of thianaphthene was dissolved in 800 milliliters of benzene. One gram of concentrated sulfuric acid having a specific gravity of 1.84, 100 milliliters of 30 percent hydrogen peroxide and 50 grams of butyric acid were added and the mixture was heated at reflux temperature and atmospheric pressure for a period of three hours. The mixture was then washed with water, extracted with 10 percent aqueous sodium hydroxide solution and finally washed again with water. The benzene was then distilled off leaving a purified naphthalene fraction in excess of 90 percent by weight of the naphthalene feed and containing 0.02 percent thianaphthene, as determined by spectrometric analysis.

What is claimed is:

1. A process for recovering naphthalene from crude naphthalene containing thianaphthene and other impurities which comprises mixing said crude naphthalene in a liquid media with an oxidizing agent consisting of a lower aliphatic monocarboxylic peracid consisting of carbon, oxygen and hydrogen, at a temperature of from 25 to 85° C., and then separating naphthalene from the thus formed mixture by distillation, the quantity of peracid employed being sufficient to oxidize the thianaphthene and other impurities in the crude naphthalene, but insufficient to react with an appreciable amount of the naphthalene.

2. A process according to claim 1 wherein said peracid is performic acid.

3. A process according to claim 1 wherein said peracid is peracetic acid.

4. A process according to claim 1 wherein said peracid is perpropionic acid.

5. A process according to claim 1 wherein said peracid is perbutyric acid.

6. A process according to claim 1 wherein said peracid is perisobutyric acid.

7. A process for recovering naphthalene from crude naphthalene containing thianaphthene and other impurities which comprises mixing said crude naphthalene in a liquid medium with an oxidizing agent consisting of a lower aliphatic monocarboxylic peracid consisting of carbon, oxygen and hydrogen, at a temperature of from 25 to 85° C., washing the thus formed mixture with water, and then separating naphthalene from said mixture by distillation, the quantity of peracid employed being sufficient to oxidize the thianaphthene and other impurities in the crude naphthalene, but insufficient to react with an appreciable amount of the naphthalene.

8. A process for recovering naphthalene from crude naphthalene containing thianaphthene and other impurities which comprises mixing said crude naphthalene in a liquid medium with an oxidizing agent consisting of a lower aliphatic monocarboxylic peracid consisting of carbon, oxygen and hydrogen, at a temperature of from 25 to 85° C., washing the thus formed mixture with a dilute solution of sodium hydroxide, and then separating naphthalene from said mixture by distillation, the quantity of peracid employed being sufficient to oxidize the thianaphthene and other impurities in the crude naphthalene, but insufficient to react with an appreciable amount of the naphthalene.

9. A process for recovering naphthalene from crude naphthalene containing thianaphthene and other impurities which comprises mixing said crude naphthalene in a liquid medium with an oxidizing agent consisting of hydrogen peroxide and a lower aliphatic monocarboxylic acid consisting of carbon, oxygen and hydrogen, at a temperature of from 25 to 85° C. and then separating naphthalene from the thus formed mixture by distillation, the quantity of oxidizing agent employed being sufficient to oxidize the thianaphthene and other impurities in the crude naphthalene, but insufficient to react with an appreciable amount of the naphthalene.

10. A process according to claim 9 wherein said acid is formic acid.

11. A process according to claim 9 wherein said acid is acetic acid.

12. A process according to claim 9 wherein said acid is propionic acid.

13. A process according to claim 9 wherein said acid is butyric acid.

14. A process according to claim 9 wherein said acid is isobutyric acid.

15. A process for recovering naphthalene from crude naphthalene containing thianaphthene and other impurities which comprises mixing said crude naphthalene in a liquid medium with an oxidizing agent consisting of hydrogen peroxide and a lower aliphatic monocarboxylic acid consisting of carbon, oxygen and hydrogen, at a temperature of from 25 to 85° C., washing the thus formed mixture with water, and then separating naphthalene from said mixture by distillation, the quantity of oxidizing agent employed being sufficient to oxidize the thianaphthene and other impurities in the crude naphthalene, but insufficient to react with an appreciable amount of the naphthalene.

16. A process for recovering naphthalene from crude naphthalene containing thianaphthene and other impurities which comprises mixing said crude naphthalene in a liquid medium with an oxidizing agent consisting of hydrogen peroxide and a lower aliphatic monocarboxylic acid consisting of carbon, oxygen and hydrogen, at a temperature of from 25 to 85° C., washing the thus formed mixture with a dilute solution of sodium hydroxide, and then separating naphthalene from said mixture by distillation, the quantity of oxidizing agent employed being sufficient to oxidize the thianaphthene and other impurities in the crude naphthalene, but insufficient to react with an appreciable amount of the naphthalene.

17. A process for separating naphthalene from admixture with thianaphthene which comprises adding to the mixture of naphthalene and thianaphthene in a liquid medium an oxidizing agent consisting of a lower aliphatic monocarboxylic peracid consisting of carbon, oxygen and hydrogen, at a temperature of from 25 to 85° C. and then separating naphthalene from said mixture by distillation, the quantity of peracid employed being sufficient to oxidize the thianaphthene, but insufficient to react with an appreciable amount of the naphthalene.

18. A process for separating naphthalene from admixture with thianaphthene which comprises adding to the mixture of naphthalene and thianaphthene in a liquid medium an oxidizing agent consisting of a lower aliphatic monocarboxylic peracid consisting of carbon, oxygen and hydrogen, at a temperature of from 25 to 85° C., washing said mixture with water and then separating naphthalene from said mixture by distillation, the quantity of peracid employed being sufficient to oxidize the thianaphthene, but insufficient to react with an appreciable amount of the naphthalene.

19. A process for separating naphthalene from admixture with thianaphthene which comprises adding to the mixture of naphthalene and thianaphthene in a liquid medium an oxidizing agent consisting of a lower aliphatic monocarboxylic peracid consisting of carbon, oxygen and hydrogen, at a temperature of from 25 to 85° C., washing said mixture with a dilute solution of sodium hydroxide and then separating naphthalene from said mixture by distillation, the quantity of peracid employed being sufficient to oxidize the thianaphthene, but insufficient to react with an appreciable amount of the naphthalene.

20. A process for separating naphthalene from admixture with thianaphthene which comprises adding to the mixture of naphthalene and thianaphthene in a liquid medium an oxidizing agent consisting of hydrogen peroxide and a lower aliphatic monocarboxylic acid consisting of carbon, oxygen and hydrogen, at a temperature of from 25 to 85° C. and then separating naphthalene from said mixture by distillation, the quantity of oxidizing agent employed being sufficient to oxidize the thianaphthene, but insufficient to react with an appreciable amount of the naphthalene.

21. A process for separating naphthalene from admixture with thianaphthene which comprises adding to the mixture of naphthalene and thianaphthene in a liquid medium an oxidizing agent consisting of hydrogen peroxide and a lower aliphatic monocarboxylic acid consisting of carbon, oxygen and hydrogen, at a temperature of from 25 to 85° C., washing said mixture with water and then separating naphthalene from said mixture by distillation, the quantity of oxidizing agent employed being sufficient to oxidize the thianaphthene, but insufficient to react with an appreciable amount of the naphthalene.

22. A process for separating naphthalene from admixture with thianaphthene which comprises adding to the mixture of naphthalene and thianaphthene in a liquid medium an oxidizing agent consisting of hydrogen peroxide and a lower aliphatic monocarboxylic acid consisting of carbon, oxygen and hydrogen, at a temperature of from 25 to 85° C., washing said mixture with a dilute solution of sodium hydroxide and then separating naphthalene from said mixture by distillation, the quantity of oxidizing agent employed being sufficient to oxidize the thianaphthene, but insufficient to react with an appreciable amount of the naphthalene.

References Cited in the file of this patent

UNITED STATES PATENTS

| | | |
|---|---|---|
| 1,590,965 | Downs | June 29, 1926 |

FOREIGN PATENTS

| | | |
|---|---|---|
| 505,742 | Great Britain | May 16, 1939 |
| 692,098 | Great Britain | May 27, 1953 |

OTHER REFERENCES

Chem. Reviews, August 1949, vol. 45, "Organic Acids," by Daniel Swern. (Only pp. 1–5, 9–11, 30, 31, 33 and 34 relied on.)